United States Patent [19]

Bayley et al.

[11] Patent Number: 5,518,850
[45] Date of Patent: May 21, 1996

[54] UNSATURATED POLYESTERS WITH VINYL SIDE CHAINS

[75] Inventors: Robert D. Bayley, Fairport; Carol A. Fox, Farmington; Thomas R. Hoffend, Webster; James R. Paxson, Walworth; Robert A. Nelson, Webster, all of N.Y.

[73] Assignee: Xerox Corporation, Stamford, Conn.

[21] Appl. No.: 316,345

[22] Filed: Sep. 30, 1994

[51] Int. Cl.$^6$ .............. G03G 9/087; G03G 9/08; C08L 67/06
[52] U.S. Cl. .............. 430/109; 525/437; 525/445
[58] Field of Search .................. 525/445, 437; 430/109

[56] References Cited

U.S. PATENT DOCUMENTS

| | | |
|---|---|---|
| Re. 31,072 | 11/1982 | Jadwin et al. . |
| 3,590,000 | 6/1971 | Palermiti et al. . |
| 3,681,106 | 8/1972 | Burns et al. . |
| 3,847,604 | 11/1974 | Hagenbach et al. . |
| 3,938,992 | 2/1976 | Jadwin et al. . |
| 3,941,898 | 3/1976 | Sadamatsu et al. . |
| 4,298,672 | 11/1981 | Lu . |
| 4,338,390 | 7/1982 | Lu . |
| 4,556,624 | 12/1985 | Gruber et al. . |
| 4,604,338 | 8/1986 | Gruber et al. . |
| 4,713,310 | 12/1987 | Horie ......... 430/109 |
| 4,775,718 | 10/1988 | Broekhuis ......... 525/63 |
| 4,824,750 | 4/1989 | Mahalek et al. . |
| 4,935,326 | 6/1990 | Creatura et al. . |
| 4,937,166 | 6/1990 | Creatura et al. . |
| 5,250,382 | 10/1993 | Shimojo et al. ......... 430/109 |
| 5,302,486 | 4/1994 | Patel et al. ......... 430/137 |
| 5,318,871 | 6/1994 | Inagaki et al. ......... 525/445 |
| 5,397,671 | 3/1995 | Bayley et al. ......... 430/109 |
| 5,407,772 | 4/1995 | Bayley et al. ......... 430/109 |

FOREIGN PATENT DOCUMENTS 58-158651  9/1983  Japan .

OTHER PUBLICATIONS

O. Olabisi et al., "Polymer–Polymer Miscibility," 1979, p. 54.

*Primary Examiner*—Susan W. Berman
*Attorney, Agent, or Firm*—Oliff & Berridge

[57] ABSTRACT

A low fix temperature toner having improved blocking performance comprises colorant and toner resin. The toner resin comprises the reaction product of (1) a diacid, diester or anhydride, (2) a diol and (3) a vinyl monomer compound having separate polyester and vinyl polymer domains with separate $T_g$'s.

8 Claims, No Drawings

UNSATURATED POLYESTERS WITH VINYL SIDE CHAINS

BACKGROUND OF THE INVENTION

The invention is directed to toner resins and toners. More specifically, the present invention relates to unsaturated polyester polymers with vinyl side chains, particularly useful for preparing low-fix temperature, crosslinked toner resins. Toners made from crosslinked resins comprising the inventive unsaturated polyester polymers exhibit desirable low temperature fixing characteristics and offset properties. Additionally, the resins exhibit high toner blocking temperatures.

BACKGROUND

Electrophotographic processes can require temperatures of 160°– 200° C. to fix toner on a support medium such as a sheet of paper or a transparency. High temperatures can reduce or minimize fuser roll life, such as with fuser rolls made of silicone rubbers or fluoroelastomers (e.g., Viton®). High temperatures can limit fixing speeds and may necessitate higher power usage during operation, such as in the operation of a xerographic copier employing a hot roll fixing mechanism.

Toner can be fixed to a support medium such as a sheet of paper or a transparency by different fixing methods. A fixing system that is very advantageous in heat transfer efficiency and is especially suited for high speed electrophotographic processes is hot roll fixing. In this method, a support medium carrying a toner image is transported between a heated fuser roll and a pressure roll with the image face contacting the fuser roll. Upon contact with the heated fuser roll, the toner melts and adheres to the support medium forming a fixed image.

Fixing performance of a toner can be characterized as a function of temperature. The lowest temperature at which a toner adheres to the support medium is referred to as the cold offset temperature (COT) and the maximum temperature at which the toner does not adhere to the fuser roll is known as the hot offset temperature (HOT). When fuser temperature exceeds HOT, some molten toner adheres to the fuser roll during fixing and is transferred to subsequent substrates containing developed images resulting in blurred images. This undesirable phenomenon is called offsetting. Between the COT and HOT of the toner is the minimum fix temperature (MFT). MFT is the minimum temperature at which acceptable adhesion of the toner to the support medium occurs as determined by, for example, a creasing test. The difference between MFT and HOT is called the fusing latitude.

Several problems exist with the hot roll fixing system described above and with toners presently used with the system. First, binder resins in the toners can require a relatively high temperature in order to be affixed to the support medium. A high temperature may result in high power consumption, low fixing speeds and reduced fuser roll and roll bearing life. Additionally, offsetting may present a problem.

Toner resins that have a low fix temperature below 200° C. ("low melt toner resins"), preferably below 160° C., and that exhibit good offset temperature performance are desirable. Processes for preparing such toner resins are desirable. Toners that operate at lower temperatures reduce power needs and increase component life. High temperatures can volatilize release oil. Volatilized release oil can cause operation problems by condensing on copier parts. Low melt toners reduce volatilization of release oil. Toners with wide fusing latitude permit liberal requirements for oil used as a release agent. The toners can provide improved particle elasticity and can minimize copy quality deterioration related to toner offset. Low-melt temperature toner resins particularly for use in hot-roll fixing xerographic processes are desirable to overcome these problems.

U.S. Pat. No. 3,590,000 to Palermiti et al. and U.S. Pat. No. 3,681,106 to Burns et al. disclose polyester resins as a toner binder. Although a minimum fix temperature of a polyester binder resin can be lower than that of a resin made from other materials, such as styrene-acrylic and styrene-methacrylic resins, use of polyester resins as toner binder can lead to decreased offset resistance and decreased glass transition temperature resulting in undesirable lower hot offset temperature.

Resin structure modification by branching, crosslinking, grafting, etc., using conventional polymerization and condensation reactions, can improve offset resistance. Burns et al. discloses mixing a trivalent or more polyol or polyacid with monomer to provide non-linear polymer modification. Branching during polycondensation results in improved offset resistance. However, too much branching can result in an increased minimum fix temperature that diminishes the advantage of the modified polymer.

Improving offset resistance by crosslinking during polymerization is illustrated in U.S. Pat. No. 3,941,898 to Sadamatsu et al. where a crosslinked vinyl type polymer prepared using conventional crosslinking was used as a binder resin. Other vinyl type resins are disclosed in U.S. Pat. Nos. Re. 31,072 (a reissue of U.S. Pat. No. 3,938,992) to Jadwin et al., 4,556,624 to Gruber et al., 4,604,338 to Gruber et al. and 4,824,750 to Mahalek et al.

U.S. Pat. No. 5,407,772 to Bayley et al. (Bayley (I)) discloses a low fix temperature toner resin consisting essentially of high density crosslinked microgel particles and linear polymer. The resin is prepared from an unsaturated linear polymer that comprises the reaction product of first, second and third monomers and optionally a fourth monomer. The first monomer is a diol having a molecular weight below about 200. The second monomer is a dicarboxylic acid or diester. The third monomer is different from the second monomer and is an aromatic dicarboxylic acid or diester. The optional fourth monomer may be added to compensate for an undesirable low glass transition temperature. The fourth monomer is a propoxylated bisphenol A, an ethoxylated bisphenol A, tetrabromo bisphenol dipropoxy ether or mixtures thereof. The Bayley et al. (I) toner can be produced at reduced cost and at a product quality equivalent to more expensive polyester toners.

A decreased glass transition temperature may accompany the advantageous lowering of fix temperature. A decrease in glass transition temperature can cause "blocking." A hot-roll fixing system operates at elevated temperatures. Toner retained in a toner reservoir in the fixing system may be affected by heat generated by a hotroll fixing system in operation over an extended period of time. The heat can cause a stored toner with a lower glass transition temperature to agglomerate. The phenomenon of agglomeration is known as blocking.

U.S. Pat. No. 5,436,103 to Bayley et al. (II) relates to polyester resins that are modified to decrease the effect of blocking. Bayley et al. (II) teaches incorporating an acid residue of an acid monomer that increases glass transition temperature of a modified unsaturated linear polymer to result in a polyester resin in a toner with a lower fix temperature but with a slightly higher glass transition temperature. The slightly higher glass transition temperature helps to avoid blocking problems. The modified unsaturated linear polymer has a glass transition temperature from about 54° C. to about 64° C. The polymer comprises a first residue of a first monomer selected from the group consisting of diacids, anhydrides, diacid esters and mixtures. The polymer comprises a second residue of a second monomer selected from the group consisting of diols and glycols and an acid residue of a substituted aromatic dicarboxylic acid.

U.S. Pat. No. 5,397,671 to Bayley et al. relates to thermoplastic binder resins that are formed by melt mixing a reactive base resin with a vinyl monomer.

Japanese Patent Document No. (Ricoh patent) teaches modifying a polyethylene wax. A low molecular weight wax is used in a free radical initiated reaction with dicoumyl peroxide as a representative free radical initiator. The resulting crosslinked polymer is a bridge type resin wherein bridges are formed by connecting linkages that are at least molecular in size.

SUMMARY OF THE INVENTION

The invention provides a toner resin comprising a reaction product of (1) an unsaturated diacid, diester or anhydride, (2) a diol and (3) a vinyl monomer compound. The toner resin is characterized by separate polyester and vinyl polymer domains with separate $T_g$'s.

The invention provides a process for preparing toner resins that are the reaction product of (1) an unsaturated diacid, diester or anhydride, (2) a diol and (3) a vinyl monomer compound, comprising polymerizing the (1) diacid diester or anhydride and (2) the diol to form an unsaturated linear polymer, dissolving the unsaturated linear polymer in (3) the vinyl monomer compound and free radically polymerizing the unsaturated linear polymer with the vinyl monomer compound in solution or suspension. The resin formed by the process comprises separate polyester and vinyl polymer domains. The resulting resins are "liquid glass" type polymers. The polyester portion acts as a liquid phase while vinyl polymer segments act as a glass phase. The resin exhibits two distinct $T_g$'s.

DESCRIPTION OF PREFERRED EMBODIMENTS

The present invention provides a process for fabricating low fix temperature toner resins having at least two distinct $T_g$'s that correspond to the $T_g$ of an unsaturated linear polyester and a $T_g$ for a vinyl polymer compound phase. The resins of the invention are prepared by polymerizing (1) the unsaturated diacid, diester or anhydride and (2) the diol to form an unsaturated linear polyester. The unsaturated linear polyester is dissolved in (3) the vinyl monomer compound. The unsaturated linear polyester is free radically polymerized with the vinyl monomer compound in solution or suspension to form a resin comprising separate polyester and vinyl polymer domains with separate $T_g$'s.

The base resin used in the process of this invention is, for example, a reactive polymer, preferably a linear reactive polymer such as, for example, a linear unsaturated polyester. In preferred embodiments, the base resin has a degree of unsaturation of about 0.1 to about 65 mole percent, preferably about 1 to about 50 mole percent. In a preferred embodiment, the linear unsaturated polyester base resin is characterized by number-average molecular weight ($M_n$) as measured by gel permeation chromatography (GPC) in the range typically from 1,000 to about 20,000, and preferably from about 1,500 to about 5,000, weight average molecular weight ($M_w$) in the range typically from 1,500 to about 120,000, and preferably from about 2,000 to about 30,000. The molecular weight distribution ($M_w/M_n$) is in the range typically from about 1.5 to about 6, and preferably from about 2 to about 4. Onset glass transition temperature ($T_g$) as measured by differential scanning calorimetry (DSC) is in the range typically from 20° C. to about 70° C., and preferably from about 25° C. about 60° C. When melt viscosity is measured with a Tinius Olsen Melt Flow Index apparatus with a 2.16 kg. wgt., the Melt Flow Index at 105° C. is from about 3 to about 500 and preferably from about 5 to about 350.

Linear unsaturated polyesters used as the base resin are in embodiments of the present invention low molecular weight condensation polymers which may be formed by the stepwise reaction between both saturated and unsaturated diacids, diesters or anhydrides and dihydric alcohols such as glycols or diols. The resulting unsaturated polyesters are reactive, that is crosslinkable, in two respects: (i) unsaturation sites (double bonds) along the polyester backbone chain; and (ii) functional groups such as carboxyl, hydroxy, and the like, groups amenable to acid-base or condensation reactions.

Typical unsaturated polyesters useful for this invention are prepared by melt polycondensation or other polymerization processes using diacids, diesters and/or anhydrides and diols. Suitable diacids and anhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like, diesters derived therefrom and mixtures thereof; and unsaturated diacids and/or anhydrides such as, for example, maleic acid, fumaric acid, chloromaleic acid, itaconic acid, citraconic acid, mesaconic acid, maleic anhydride, diesters thereof, and the like, and mixtures thereof. Suitable diols include, but are not limited to, for example, propylene glycol, ethylene glycol, diethylene glycol, neopentyl glycol, dipropylene glycol, dibromoneopentyl glycol, propoxylated bisphenol-A, ethoxylated bisphenol-A, 2,2,4-trimethylpentane-1,3-diol, tetrabromo bisphenol dipropoxy ether, 1,4-butanediol, 1,3 butanediol, and the like, and mixtures thereof, soluble in highly dissolving solvents such as, for example, tetrahydrofuran, toluene, and the like.

Preferred linear unsaturated polyester base resins are prepared from unsaturated diacids, diesters and/or anhydrides such as, for example maleic anhydride, fumaric acid, and the like and mixtures thereof, and diols such as, for example, propoxylated bisphenol-A, ethylene glycol, propylene glycol, 1,3 butanediol, and the like, and mixtures thereof. Suitable base resins are prepared from unsaturated diacids, diesters and/or anhydrides alone or in combination with saturated diacids, diesters and/or anhydrides such as terephthalic acid, isophthalic acid and succinic acid and the like, and mixtures thereof. Particularly preferred polyesters are poly(propoxylated bisphenol A fumarate), poly(propylene glycol/ethylene glycol/fumarate/terephthalate) and poly(1,3 butanediol/fumarate/terephthalate).

Substantially any suitable unsaturated polyester can be used in the process of the invention, including unsaturated polyesters known for use in toner resins and including unsaturated polyesters whose properties previously made them undesirable or unsuitable for use as toner resins but which adverse properties are eliminated or reduced by branching or crosslinking the unsaturated polyesters by processes of the present invention.

The vinyl monomer compounds useful in the present invention can be any vinyl monomer or mixture of monomers that are readily polymerizable by free radical species thereby functioning as branching or crosslinking "spacer" agents. The monomers are selected from the group consisting of styrene and derivatives thereof, conjugated dienes and derivatives thereof acrylates and derivatives thereof, and mixtures thereof.

Suitable vinyl monomer compounds useful in the present invention are any vinyl monomer or mixture of monomers that are readily polymerizable by free radical species. The monomers can be selected for example, from the group consisting of styrene and derivatives thereof, conjugated dienes and derivatives thereof, acrylates and derivatives thereof, methacrylates and derivatives thereof and functional vinyl monomers and mixtures thereof. Functional vinyl monomers are monomers that have a vinyl group and have an additional functionality such as an amine or acid functionality. Functional vinyl monomers include, for example, 4 vinyl pyridine, dimethyl amino ethyl methacrylate, acrylic acid, methacrylic acid.

Any appropriate initiation technique for crosslinking can be used in the process of the invention. Free radical initiators such as, for example, organic peroxides or azo compounds are preferred for this process. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, o,o-t-butyl o-isopropyl monoperoxy carbonate, 2,5-dimethyl 2,5-di(benzoyl peroxy)hexane, o,o-t-butyl o-(2-ethyl hexyl)monoperoxy carbonate, and o,o-t-amyl o-(2-ethyl hexyl)monoperoxy carbonate, alkyl peroxides such as, for example, dicoumyl peroxide, 2,5-dimethyl 2,5-di(t-butyl peroxy)hexane, t-butyl coumyl peroxide, a-a-bis(t-butyl peroxy)diisopropyl benzene, di-t-butyl peroxide and 2,5-dimethyl 2,5-di(t-butyl peroxy)hexyne-3, alkyl hydroperoxides such as, for example, 2,5-dihydro peroxy 2,5-dimethyl hexane, coumene hydroperoxide, t-butyl hydroperoxide and t-amyl hydroperoxide, and alkyl peroxyketals such as, for example, n-butyl 4,4-di(t-butyl peroxy)valerate, 1,1-di(t-butyl peroxy)3,3,5-trimethyl, cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate. Suitable azo compounds include 2,2'-azobis(isobutyronitrile), 2,2'-azobis(2,4-dimethyl valeronitrile), 2,2'-azobis(methyl butyronitrile), 1,1'-azobis(cyano cyclohexane) and other similar known compounds.

A resin diluted free radical initiator compound can be any of the above radical initiators diluted in unreactive matrix resin. For example, useful diluent resins include these resins or waxes without olefinic double bonds, carboxylic acids or hydroxyl groups, other functional groups which are not readily abstracted in free radical reactions under the conditions of the present process, and are selected from the group consisting of methyl terpolymer, a polyvinylidine fluoride, a polymethyl methacrylate, hydrogenated poly(styrene-butadiene), polyisobutylmethacrylate, polyacrylate, polymethacrylate, polystyrene, polystyrene acrylate, polystyrene methacrylate, polyvinyl chloride, a wax component with a weight average molecular weight from about 1,000 to about 6,000, and mixtures thereof.

In embodiments of the present invention, the concentration of the free radical initiator compound to the total reactants (base resin and vinyl monomer) can be from about 0.01 to about 10 wt. %. The wt. % of vinyl monomer to the total reactants (base resin and vinyl monomer) can be from about 40 to about 90%. When a resin diluted-free radical initiator compound is used as the initiator, the wt. % of free radical initiator compound to the optional diluent resin or wax can be from about 2 to about 30 wt. %.

Preferably, the rate of reaction of free radical species generated on the backbone of the polymer chain by the free radical initiator, with the vinyl monomer crosslinking agent, is more rapid than a competing direct interchain coupling reaction. The following discussion of reactivity ratios illustrates the importance of the relative ratio of reaction. It is known that the reactivity ratios for vinyl polymerization favors the heteromonomer reaction of styrene to fumarate and fumarate to styrene rather than the homomonomer reaction of fumarate to fumarate, as disclosed in "*UNSATURATED POLYESTERS: STRUCTURE AND PROPERTIES*", by Herman V. Boenig, p. 17, Elsevier Publishing Co., New York, (1964). The letters $r_1$ and $r_2$, respectively, represent relative monomer reactivity ratios defined by the equations:

$$r_1 = \frac{k_{11}}{k_{12}} = \frac{\text{Styrene} - \text{Styrene}}{\text{Styrene} - \text{Fumarate}} = 0.21 \text{ to } 0.30$$

$$r_2 = \frac{k_{22}}{k_{21}} = \frac{\text{Fumarate} - \text{Fumarate}}{\text{Fumarate} - \text{Styrene}} = 0.02 \text{ to } 0.07$$

wherein a growing chain, ending in $m_1$, the addition of $M_1$ represents $k_{11}$, wherein a growing chain, ending in $m_1$, the addition of $M_2$ represents $k_{12}$, wherein a growing chain, ending in $m_2$, the addition of $M_2$ represents $k_{22}$, and wherein a growing chain, ending in $m_2$, the addition of $M_1$ represents $k_{21}$. The reactivity therefore of adding either styrene radicals to fumarate double bonds, or fumarate radicals to styrene double bonds is a highly favored and a predominant reaction pathway and occurs in preference to the formation of homopolymers of fumarate or homopolymers of styrene. Although not wanting to be limited by theory, it is believed that the foregoing discussion of reactivity ratios is applicable to preferred monomer reactions and products formed thereby in embodiments of the present invention.

In the branching or crosslinking reaction that occurs in processes of the present invention, the free radical initiator, such as for example benzoyl peroxide, disassociates to form free radicals which preferentially attack the linear unsaturated base resin polymer chains, for example, at double bonds, to form polymeric radicals or radical sites on the polymer chain backbone. Branching or crosslinking occurs as these polymeric radical sites react with vinyl monomer or monomers in close proximity thereto in preference to other unsaturated chains or other polymeric radicals, and thereafter the resulting chain pendant styryl radicals or oligomeric styryl radicals react preferentially intermolecularly with unsaturated bonds or equivalent available radical chain species in the reactive base resin. Since the concentration of styrene or other vinyl monomer is high and these monomers are more highly mobile than the reactive base resin, appreciable length chains of the styrene or other vinyl monomers are expected to be formed before the growing chain end radical reacts with another double bond site on a reactive polymer chain backbone. The resulting structure may consist of reactive base resin from which extends appreciable length branches of styrene or other vinyl groups or of base polymer resin from which extends appreciable length segments of styrene or other vinyl groups that ultimately graft onto another reactive base polymer resin chain at a double bond site.

In the final polymer of the invention, the polyester base resin can form separate domains from the domains formed by clustering of styrene or other vinyl group segments. This may be due to differences in solubility parameters of the two types of polymer. Dual $T_g$'s are measured by Differential Scanning Calorimetry (DSC). Transmission electron microphotograph (TEM) photos show morphological patterns that are very similar to classical examples of domain behavior described in the polymer literature. The dual $T_g$'s and the TEM photos support the morphology of separate domains.

In the branching or crosslinking reaction, the chemical initiator, for example benzoyl peroxide, disassociates to form free radicals (step I) that attack the linear unsaturated base resin polymer chains, for example, at double bonds to form polymeric radicals (step II) that in turn readily react with one or more molecules of vinyl monomer, for example, styrene to form monomer or oligomeric grafted vinyl monomer chain radical species. Crosslinking of the present invention is believed to occur as these oligomeric graft radicals further react with other unsaturated chains or other monomers of polymeric radicals (step III) to form high molecular weight but loosely crosslinked gel particles. The polymeric chains are not in close proximity to one another since one or more vinyl monomers provide "spacer" units that lower the crosslinked density compared to a directly crosslinked sample prepared in the absence of the vinyl monomer oligomer crosslinked spacer.

Branching occurs in the case where initiator dissociates to form free radicals (step I) that attack the linear unsaturated base resin polyester chains, for example double bonds, to form polymeric radicals. The polymeric radicals (step II) readily react with one or more molecules of vinyl monomer, for example styrene, to form oligomeric grafted vinyl monomer chain radical species. In this case, the chain terminates by typical chain termination reaction without attaching to another reactive site on the reactive base resin backbone.

The crosslinking that occurs in the process of the invention is characterized by at least one reactive site, one unsaturation or double bond, within a polymer chain that reacts substantially directly, with one or more vinyl monomer(s), to form a grafted monomer or oligomeric units. The final step in the crosslinking reaction sequence may occur by a number of mechanisms. Without intending to be limited by theory, it is believed that the crosslinking process of the present invention occurs predominantly through the sequence shown in the following steps I through III. The single headed arrow represents free radical species attack on an olefin or another free radical resulting in covalent bond formation. Alternatively, the free radical species can abstract an atom, but this is a less preferred pathway in view of the aforementioned reactivity ratios.

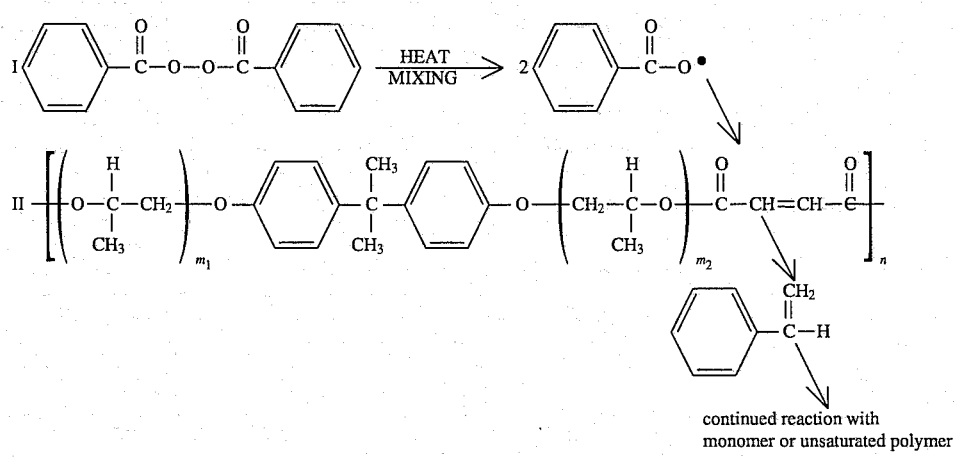

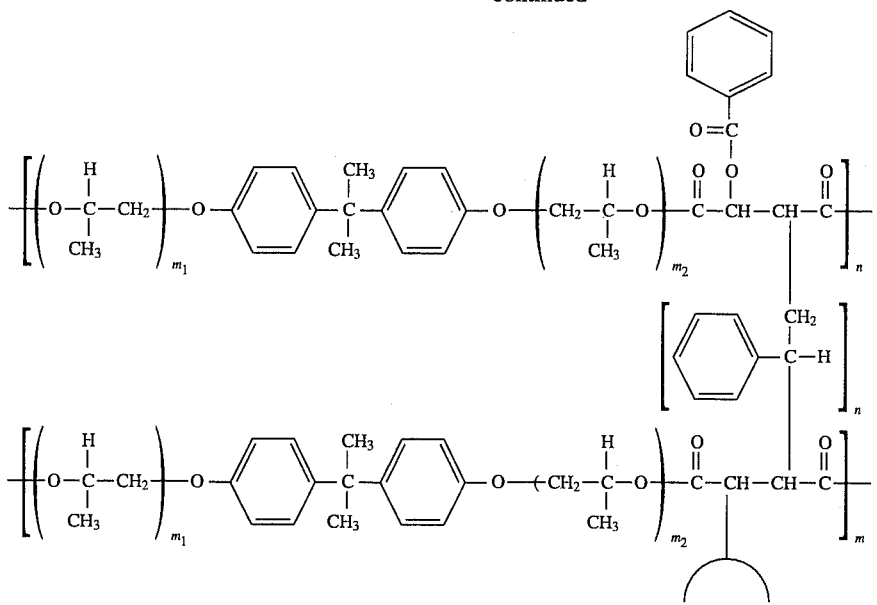

For example, an exemplary propoxylated bisphenol A fumarate unsaturated polyester undergoes the first step (step I) in the crosslinking sequence with a free radical initiator, for example, benzoyl peroxide obtained in a pelletized form, thereby producing a free radical on the polymer resin chain backbone that in turn preferentially attacks a vinyl monomer in the immediate vicinity and in turn produces monomeric or oligomeric vinyl graft radical species. As the vinyl monomer is consumed, the oligomeric graft species begin to preferentially react intermolecularly with other unsaturated sites on another base polymer resin by further radical addition reactions or by hydrogen abstraction reactions as shown in the accompanying scheme below. The chain abstraction product can further react with other free radical species and contribute to termination of the crosslinking process and additional intermolecular crosslinking.

Oligomeric graft or crosslinked resin radical •

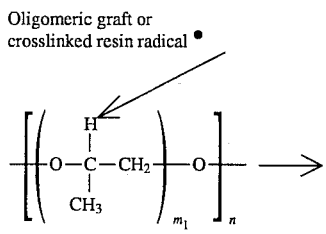

Oligomeric graft or crosslinked resin radical —H

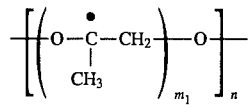

When crosslinked in this manner, the crosslinking between chains produces a high molecular weight intermolecularly bonded assemblage of polyester resin molecules that are connected yet separated by vinyl polymer spacer linkages, ultimately forming a loosely crosslinked structure that remains thermoplastic.

The polymers of the invention can be synthesized by suspension polymerization. For example, an amount of reactive base polyester, for example poly 1,3 butylene terephthalate cofumarate, is dissolved in the vinyl monomer, for example styrene. An appropriate amount of a free radical initiator, such as benzoyl peroxide, is added and mixed with gentle stirring until all ingredients are thoroughly mixed. The mixture is added to a reactor with deionized water, surfactants and stabilizing agents. The temperature is raised to for example 90° C., and maintained at that temperature for the duration of the polymerization.

Alternatively, the polymer can be made by solution polymerization. In this procedure the reactive base polyester, vinyl monomer(s) and free radical initiator are mixed as described previously or added directly to a solvent such as toluene. Again, the reactor is heated and the mixture stirred for an appropriate length of time until polymerization is completed. In the case of a solution polymerization, the solvent is removed from the resulting polymer solution by evaporation.

The polyesters of the invention exhibit a polyester liquid phase and a vinyl glass phase and are characterized by two $T_g$'s, one for the liquid phase and one for the glass phase. The two phases and separate $T_g$'s permit separate control to provide a low minimum fix temperature (MFT) and wide fusing latitude from the polyester phase and high toner blocking temperature from the vinyl phase.

The solubility of a vinyl polymer in a polyester is generally expected to be low because the polyester is a very polar polymer with high dipole moments due to the carboxyl groups. Solubility parameters of poly(ethylene terephthalate), a polyester, are for example listed as 9.7–10.7 and of polystyrene are 8.5–9.3 (reference Polymer-Polymer Miscibility by Olaqoke Olabisi, Lloyd M. Robeson, and Montgomery T. Shaw, Academic Press Inc., New York, N.Y., 1979, page 54). In the liquid glass polymers of the invention, the two dissimilar types of polymers can be forced into intimate contact because they are chemically bonded to each other through the reactive double bond on the polyester chain and through free radical polymerization of the vinyl monomers. Because of tendency to associate with like moieties, the vinyl segments form clusters or domains with like vinyl segments and the polyester chains form clusters or domains with like polyester chains. However, because the vinyl segments are chemically bonded to the polyester chains, the ability of these two moieties to disassociate from each other is limited. Hence, the resins have the intimate domain structure shown by the dual $T_g$'s and the morphology shown in the TEM's.

The morphology can be changed by changing the concentration of either polyester or vinyl moiety. For example, where 20 wt. % of reactive polyester is used with 80 wt. % of vinyl monomers, the morphology resembles circular domains of polyester (either spheres or cross-sectioned rods) within the higher concentration vinyl phase. When the concentration of reactive polyester is 50 wt. % with 50 wt. % of vinyl monomers, a lamellar morphology is seen.

These liquid glass polymers offer possibilities for changing properties of a polymer by the choice, concentration and molecular weight of reactive base polyester and also by the choice and concentration of vinyl monomers to affect molecular weight. For example, it is possible to synthesize a polyester with a very low $T_g$ (the liquid phase) and to trap it within the glass phase of a higher $T_g$, more rigid structure, for example polystyrene. In this way, the polystyrene phase prevents toner blocking from becoming a problem because it prevents the lower $T_g$ polyester from cold flowing during storage. Once heated as for example during the fusing event, the glass phase softens and the liquid phase flows and fuses to paper to provide low minimum fuse temperatures. Since the liquid phase is chemically bonded to the glass phase, cohesivity is great enough to prevent the polymer from offsetting to the fuser roll and Hot Offset is prevented. This results in a wide fusing latitude.

The resins are generally present in the toner in an amount of from about 40 to about 98 percent by weight, and more preferably from about 70 to about 98 percent by weight, although the resin may be present in greater or lesser amounts, provided that the objectives of the invention are achieved. For example, toner resin produced by processes of the present invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner particles preferably have an average volume particle diameter of about 5 to about 25, more preferably about 5 to about 15 microns.

Various suitable colorants can be employed in toners of the invention, including suitable colored pigments, dyes, and mixtures thereof including carbon black, such as Regal 3300 carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Hellogen Blue, Hostaperm Blue, Neopan Blue, PV Fast blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), M08699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions produced by the present invention, preferably in an amount of about 0.1 to about 10, more preferably about 1 to about 3, percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as Bontron E84™ or E88™ (Hodogaya Chemical); and the like.

Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated hereby by reference.

The selected carrier particles can be used with or without a coating, the coating generally being comprised of fluoropolymers, such as polyvinylidene fluoride resins, terpolymers of styrene, methyl methacrylate, a silane, such as triethoxy silane, tetrafluoroethylenes, other known coatings and the like.

The diameter of the carrier particles is generally from about 50 microns to about 1,000 microns, preferably about 200 microns, thus allowing these particles to possess sufficient density and inertia to avoid adherence to the electrostatic images during the development process. The carrier particles can be mixed with the toner particles in various suitable combinations. Best results are obtained when about 1 part toner to about 10 parts to about 200 parts by weight of carrier are mixed.

Toners produced by the process of the invention can be used in known electrostatographic imaging methods, although the fusing energy requirements of some of those methods can be reduced in view of the advantageous fusing properties of the subject toners as discussed herein. Thus, for example the toners or developers can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 150° C.

The invention will further be illustrated in the following, nonlimiting examples, it being understood that these examples are intended to be illustrative only and that the invention is not intended to be limited to the materials, conditions, process parameters and the like recited herein. Parts and percentages are by weight unless otherwise indicated.

EXAMPLES

Evaluations of the Examples were made by the following procedure:

Uniform unfused images with 0.35 to 0.55 mg/cm² of toner density were fused by passing them through a bench fuser roll fixture. The fixture consisted of a shortened Xerox 2510 fuser roll with a 3.3 inch diameter stainless steel core with a 5–6 rail Silicone rubber coating. The fabric guide or "sling" was made of Teflon coated fiberglass and the wrap angle was 75 degrees. Both fuser roll and fabric guide were standard 2510 components. The temperature was controlled and monitored with a thermocouple that sensed roll surface temperature just before paper entry into the "nip". Roll speed was set for 2 inches per second for all toner evaluations. The nip length was 2.5 inches for an effective dwell time of 1.25 seconds. The pressure was 0.17 pounds per linear inch (pressure applied by pressure blade on back of fabric guide which presses paper against the roll at the entrance nip).

All of the toner images were evaluated by Taber Abrader. Six density measurements were measured on the fused image using an Answer II Densitometer by Macbeth that was tied into a Leading Edge computer. The sample was then placed in the Model 503 Standard Abrasion Testor by Taber Instrument Company and abraded for 10 cycles using a CS-10 abrasor wheel. The image density of the abraded sample was then remeasured (six measurements). The density data files were then used in the Taber-Dalal 04 program to determine Fix levels. The output consisted of both a numerical and alphabetical (A, B, C, etc.) rating of fix level. The Fix level was then determined and normalized to the toner mass. The experimental toner data was compared to a control Xerox 2510 toner which gave a "C" fix level at 300° F. in this test fixture.

Comparative Example 1

An unsaturated polyester base resin was prepared by a conventional polycondensation reaction carried out in a three liter, four necked resin kettle fitted with a thermometer, a stainless steel stirrer, a glass inlet tube and a reflux condenser. The flask was supported and heated in an electric mantle. A liquid diol was introduced into the flask, followed by a solid ester and an anhydride.

The ingredients were 20 moles of 1.3 butanediol, 9.37 moles of dimethyl terephthalate, and 0.625 moles of maleic anhydride. The maleate isomerizes to the fumarate form under the conditions typical for a polycondensation reaction so the product of this reaction is referred to as a fumarate. The mixture was heated slowly until most of the ingredients were melted and then slow stirring was begun. Temperature was held at 145° C. with an argon sparge for 30 minutes. At that time, 0.016 mole of isopropyl titanate catalyst was added. The argon was continuously bubbled through the stirred mixture and the stirring speed was increased while methanol and water were collected. Temperature was raised to about 200° C. with stirring until about 95% of theoretical methanol and water was collected. The mixture was cooled, stirring was stopped and the glassware was changed to glassware suitable for application of a vacuum.

The mixture was again heated, and stirring slowing increased while a vacuum was applied. The 1,3 butanediol was removed and collected in cold traps as the condensation polymerization continued and the polymer chain lengths increased in size. The reaction was carried out at 200° C. with average pressure of about 100 microns of vacuum. Samples of polymer were periodically withdrawn to determine the extent of the reaction by measurement of the Melt Flow Index of the polymer product.

The above reaction was continued until a 1,3-butylene-terphthalate-co-fumarate compound was obtained with a $T_g$ of 38° C. and a Melt Flow Index of 15 at 105° C. using 2.16 kg weight. The rheology of this polymer was determined as $T_1$ (the temperature corresponding to a melt viscosity of about 75,000 poise when measured at 10 radians per second)= 82° C. and $T_2$ (the temperature corresponding to a melt viscosity of about 4,500 poise when measured at 10 radians per second)=109° C.

A toner was made from the linear polyester and 10% by weight of BP 1300 carbon black. The toner had a Tg of 45° C. and the toner blocked at ambient conditions in the container. Because it was blocked in the container this toner could not be made into a developer and no images were made from this toner for fusing testing.

Example II

POLYESTER BASE RESIN PREPARATION

An unsaturated polyester base resin was prepared by a polycondensation reaction carried out in a three liter, four necked resin kettle fitted with a thermometer, a stainless steel stirrer, a glass inlet tube and a reflux condenser. Ingredients were added with a liquid diol introduced first, followed by a solid ester and an anhydride.

The ingredients were 20 moles of 1,3 butanediol, 9.37 moles of dimethyl terephthalate, and 0.625 moles of maleic anhydride. The maleate isomerizes to the fumarate form under the conditions typical for a polycondensation reaction so the product of this reaction is referred to as a fumarate. The mixture was heated slowly until most of the ingredients were melted and then slow stirring was begun. Temperature was held at 145° C. with an argon sparge for 30 minutes. Then 0.016 mole of isopropyl titanate catalyst was added. Argon was continuously bubbled through the stirred mixture and the stirring speed was increased while methanol and water were collected. The temperature was raised to about 200° C. with stirring until about 95% of the theoretical methanol and water was collected. The mixture was cooled, stirring was stopped and the glassware was changed to glassware suitable for application of a vacuum.

The mixture was heated and stirred while a vacuum was applied. The reaction was carried out at 200° C. with average pressure of about 100 microns of vacuum. Samples of polymer were periodically withdrawn to determine the extent of the reaction by measurement of the Melt Flow Index of the polymer product.

The reaction was continued until a 1,3-butylene-terephthalate-co-fumarate compound with a $T_g$ of 26.9° C. and a Melt Flow Index of 305 at 105° C. using 2.16 kg weight was obtained. The rheology of this polymer was determined as $T_1$ of <60° C. and $T_2$ of 80° C.

SUSPENSION POLYMERIZATION

Fifty percent (50%) by weight (990 g) of the reactive base polyester, poly 1,3-butylene-terephthalateco-fumarate as described above, was dissolved in 50% by weight of a mixture of 77% by weight styrene (762.3 g) and 23% by weight of n-butyl acrylate (227.7 g). Benzoyl peroxide (1.2% based on vinyl monomer content of 15.45 g) was added and mixed with gentle stirring until all ingredients were thoroughly mixed. The mixture was then placed in a separatory funnel.

A 6-liter water jacketed glass reactor equipped with a stainless steel baffle and impeller was used for the suspension polymerization. The reactor was equipped with an addition port for the addition of reactants, an I²R connected to a thermometer and a cooling coil and a refluxing condenser. A stainless steel cooling coil was immersed in the reactor. Water was circulated through the cooling coil and mixing was accomplished with an impeller blade system.

The reactor was charged with 1700 g of 3% solution of polyvinyl alcohol further diluted with deionized water. This resulted in a total of 4080 g of a 1.25% solution of polyvinyl alcohol colloidal stabilizing agent. The mixture was heated with stirring at 200 RPM. Once a temperature of 75° C. was reached, monomer solution was slowly added from the funnel. The stopcock of the funnel was adjusted to provide a steady stream of monomer solution dripped into the stirred, stabilized water phase. Stirring speed was adjusted so that beads of monomer were formed that were about 0.5 to 1 mm in diameter. Temperature was maintained at 90° C. for the duration of the polymerization, about 5 hours. The temperature was raised to 95° C. for 1 hour to guarantee completion of the reaction. The reaction mixture was cooled to room temperature. A suspension was emptied from the reactor into a sieve and washed with water and dried to provide beads of suspension polymer. The suspension polymer had dual $T_g$ of 29° and 48° C. Melt Flow Index was 21 at 150° C. and the rheology of the polymer was $T_1=87°$ C. and $T_2=138°$ C.

A toner was made from 90% by weight of the suspension polymer with 10% by weight of BP1300 carbon black. The toner had dual Tg of 37.6 and 59.7° C. and Melt Flow Index of 6.4 at 150° C. The blocking temperature of the toner was 110° C. The toner had a MFT of 280° F. with a fix level equal to the 2510 control toner at 300° F.

Example III

Twenty percent (20%) by weight (378 g) of the reactive base polyester poly 1,3-butylene-terephthalateco-fumurate as described above in Example II, was dissolved in 80% by weight of a mixture of 77% by weight styrene (1164 g) and 23% by weight of n-butyl acrylate (348 g). Benzoyl peroxide (1.2% based on vinyl monomer content of 23.6 g) was added and mixed with gentle stirring until all ingredients were thoroughly mixed.

The mixture was suspension polymerized by the procedure of Example II. The resulting suspension polymer had dual Tg of 32° and 53° C. a Melt Flow Index of 60.5 at 150° C. and a rheology, $T_1=100°$ C. and $T_2=143°$ C.

A toner was made from 90% by weight of the suspension polymer with 10% by weight of BP1300 carbon black. The toner had a broad Tg of about 58.1 and Melt Flow Index of 11.0 at 150° C. The blocking temperature of the toner was 115° C. The toner had a MFT of 270° F. with a fix level equal to the 2510 control toner at 300° F.

Example IV

SUSPENSION POLYMERIZATION

Fifty percent (50%) by weight (990 g) of the reactive base polyester poly 1,3-butylene-terephthalate-co-fumurate as in Comparative Example I was dissolved in 50% by weight of a mixture of 77% by weight styrene (762.3 g) and 23% by weight of n-butyl acrylate (227.7 g). Benzoyl peroxide (1.2% based on vinyl monomer content of 15.45 g) was added and mixed with gentle stirring until all ingredients were thoroughly mixed.

The mixture was suspension polymerized by the procedure of Example II. The resulting suspension polymer had a dual $T_g$ of 35° and 51° C., Melt Flow Index of 1.8 at 150° C. and a rheology, $T_1=90°$ C. and $T_2=155°$ C.

A toner was made from 85% by weight of the suspension polymer with 10% by weight of BP1300 carbon black and 5% 660P wax. The toner had dual $T_g$ of 46° C. and 58° C. and Melt Flow Index of 1.3 at 150° C. The blocking temperature of the toner was 115° C. The toner had a MFT of 305° F. with a fix level equal to the 2510 control toner at 300° F. but excellent fusing latitude. The Hot Offset Temperature could not be determined since it was greater than the 400° F. limit of the fusing test device.

Example V

Twenty percent (20%) by weight (396 g) of the reactive base polyester poly 1,3-butylene-terephthalateco-fumurate as described above in Comparative Example I was dissolved in 80% by weight of a mixture of 77% by weight styrene (1219.7 g) and 23% by weight of n-butyl acrylate (364.3 g). Benzoyl peroxide (1.2% based on vinyl monomer content of 24.7 g) was added and mixed with gentle stirring until all ingredients were thoroughly mixed.

The mixture was suspension polymerized by the procedure of Example II. The resulting suspension polymer had dual Tg of 39° and 49° C., Melt Flow Index of 18.8 at 150° C. and rheology, $T_1=98°$ C. and $T_2=147°$ C.

A toner was made from 85% by weight of the suspension polymer with 10% by weight of BP1300 carbon black and 5% 660P wax. The toner had a broad Tg of below 40° (the trace was broad in that region and it was difficult to determine the exact onset Tg) and 48° C. and Melt Flow Index of 16 at 150° C. The blocking temperature of the toner was 125° C. The toner had a MFT of 300° F. but excellent fusing latitude. The Hot Offset temperature could not be determined since it was greater than the 400° F. limit of the fusing test device.

The toners of Example IV and Example V gave an excellent matte finish whereas the control 2510 toner gave a mottled glossy finish.

What is claimed is:

1. A toner resin comprising a reaction product of (A) a linear polyester resin prepared from (1) an unsaturated diacid, diester or anhydride, and (2) a diol and at least 50 weight % of (B) a vinyl monomer compound in the presence of a free radical initiator compound to form a branched or crosslinked resin having separate polyester domains and vinyl polymer domains intermolecularly bonded, wherein each domain has a, distinct separate $T_g$.

2. The toner resin of claim 1, wherein said linear polyester resin (A) is a polyester prepared from (1) diacids, diesters or anhydrides selected from the group consisting of succinic acid, glutaric acid, adipic acid, pimelic acid, suberic acid, azelaic acid, sebacic acid, isophthalic acid, terephthalic acid, hexacloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, maleic acid, fumaric acid, chloromaleic acid, itaconic acid, citraconic acid, mesaconic acid, maleic anhydride, and ester derivatives thereof, and mixtures thereof, and (2) diols selected from the group consisting of propylene glycol, ethylene glycol, diethylene glycol, neopentyl glycol, dipropylene glycol, dibromoneopentyl glycol, propoxylated bisphenol-A, ethoxylated bisphenol A, 2,2,4-trimethylpentane-1,3-diol, tetrabromobisphenol dipropoxy ether, 1,4-butanediol, 1,3 butanediol, and mixtures thereof.

3. The toner resin of claim 1, wherein said free radical initiator compound is selected from the group consisting of organic peroxides, azobisalkylnitriles, peroxycarbonates, and mixtures thereof.

4. The toner resin of claim 1, wherein said vinyl monomer (B) is selected from the group consisting of styrene, conjugated dienes, alkyl acrylates, alkyl methacrylates, vinyl monomers that have a vinyl group and have an additional different functional group and mixtures thereof.

5. The toner resin of claim 4, wherein said functional vinyl monomer (B) is selected from the group consisting of 4-vinyl pyridine, dimethyl amino ethyl methacrylate, acrylic acid and methacrylic acid.

6. The toner resin of claim 1, comprising a reaction product having at least one polyester domain characterized by a $T_g$ of between 25° to 60° C. and at least one vinyl polymer domain characterized by a $T_g$ of between 55° and about 80° C.

7. The toner resin of claim 1, wherein said linear polyester resin (A) is poly(propoxylated bisphenol A fumarate), poly(propylene glycol/ethylene glycol/fumarate/terephthalate) or poly(1,3 butane diol/fumarate/terephthalate.

8. A low fix temperature toner having improved blocking temperature, comprising colorant and the toner resin according to claim 1.

* * * * *